United States Patent [19]

Komai et al.

[11] Patent Number: 4,633,396

[45] Date of Patent: Dec. 30, 1986

[54] AUTOMATIC COMPLEX REGISTRATION IN A ELECTRONIC CASH REGISTER

[75] Inventors: Kensaku Komai, Yamatokoriyama; Eiji Yoshida, Kashihara, both of Japan

[73] Assignee: Sharp Kabushiki Kaisha, Osaka, Japan

[21] Appl. No.: 613,213

[22] Filed: May 23, 1984

[30] Foreign Application Priority Data

May 27, 1983 [JP] Japan ................... 58-94677

[51] Int. Cl.⁴ ................. G06F 15/02; G06F 13/06
[52] U.S. Cl. ................... 364/405; 364/900
[58] Field of Search ........................... 364/405

[56] References Cited

U.S. PATENT DOCUMENTS 4,293,911 10/1981 Oomishi ................. 364/405
4,430,713 2/1984 Nakatani et al. ............. 364/405
4,450,526 5/1984 Nakatani et al. ............. 364/405
4,508,962 4/1985 Yamasaki ................. 364/405

Primary Examiner—Jerry Smith
Assistant Examiner—Kim Thanh Bui
Attorney, Agent, or Firm—Birch, Stewart, Kolasch and Birch

[57] ABSTRACT

An electronic cash register includes department keys for instructing a department registration operation. A department memory includes a memory area for storing an automatic complex registration number which defines an automatic complex registration operation when a corresponding department key is actuated. A complex registration memory stores a set of desired PLU code numbers related to the automatic complex registration number. Thus, when a desired department key is actuated, the registration related to a plurality of commodities defined by the set of PLU code numbers stored in the complex registration memory is automatically conducted.

2 Claims, 7 Drawing Figures (PRESET)

(REGISTRATION)

AUTOMATIC COMPLEX REGISTRATION IN A ELECTRONIC CASH REGISTER

BACKGROUND OF THE INVENTION

1. Field of the Invention

The present invention relates to an electronic cash register and, more particularly, to an improvement in an electronic cash register which has a price-look-up (PLU) registration function.

2. Description of the Prior Art

An electronic cash register has been developed, wherein unit cost information is preset for respective commodities, and the thus stored unit cost information is read out when a department key or a PLU key is actuated in the registration operation so as to automatically conduct the registration operation.

There is a possibility that a plurality of predetermined commodities are ordered or purchased at a same time. In a restaurant, a set menu is provided, which serves a set of articles, for example, beef steak, salad, rice and coffee when the set menu is ordered. In the conventional electronic cash register, the operator must register the articles one by one through the use of the PLU key or the department key even though the predetermined articles are purchased at a same time. The registration operation will become easy if the set of articles are automatically registered when one specific key is actuated.

OBJECTS AND SUMMARY OF THE INVENTION

Objects of the Invention

Accordingly, an object of the present invention is to provide a novel registration control system in an electronic cash register.

Another object of the present invention is to provide an electronic cash register which ensures an easy registration operation when a set of predetermined articles are purchased at the same time.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

To achieve the above objects, pursuant to an embodiment of the present invention, the registration operation related to a plurality of commodities is automatically conducted when a specific single key is actuated. More specifically, a preset operation is first conducted so that a plurality of PLU codes are preset in a predetermined memory section which is associated with a preselected department key. When the preselected department key is actuated in the registration operation mode, the above-mentioned plurality of PLU codes are read out so as to automatically conduct the registration operation related to the plurality of PLU codes. When the department key is assigned to a set menu in a restaurant, the registration operation related to the set of articles, for example, beef steak, salad, rice and coffee is automatically conducted when the single department key is actuated in the registration mode.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
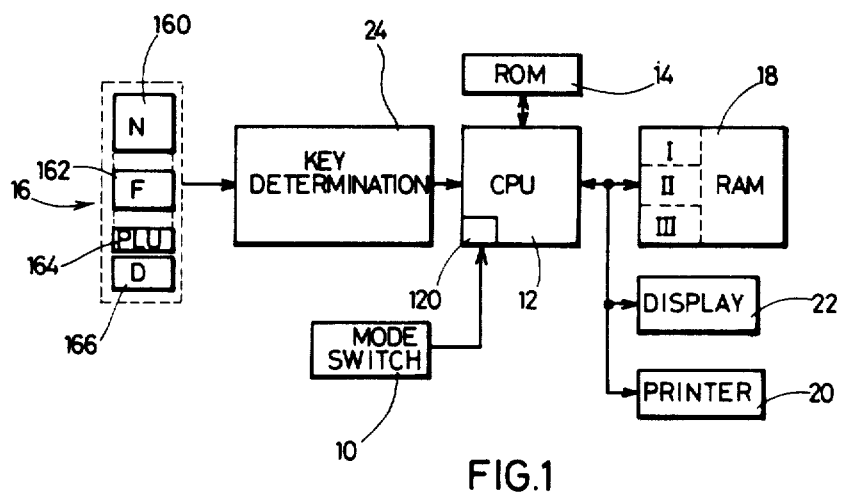
FIG. 1 is a block diagram of an embodiment of an electronic cash register of the present invention.

An electronic cash register of the present invention includes a mode selection switch 10 for selectively placing the electronic cash register in the registration mode, the preset mode, the reset mode, etc. A central processing unit (CPU) 12 is connected to a read only memory (ROM) 14 which stores programs for controlling the operation of the electronic cash register. A keyboard panel 16 includes numeral keys 160, function keys 162, a price-look-up (PLU) key 164, and department keys 166. A random access memory (RAM) 18 is connected to the central processing unit (CPU) 12. The random access memory (RAM) 18 stores transaction information registered through the keyboard panel 16. The random access memory (RAM) 18 includes a memory area for storing unit cost information related to each of PLU codes. The electronic cash register further includes a printer unit 20, a display unit 22, and a key determination circuit 24.

Figure 2:
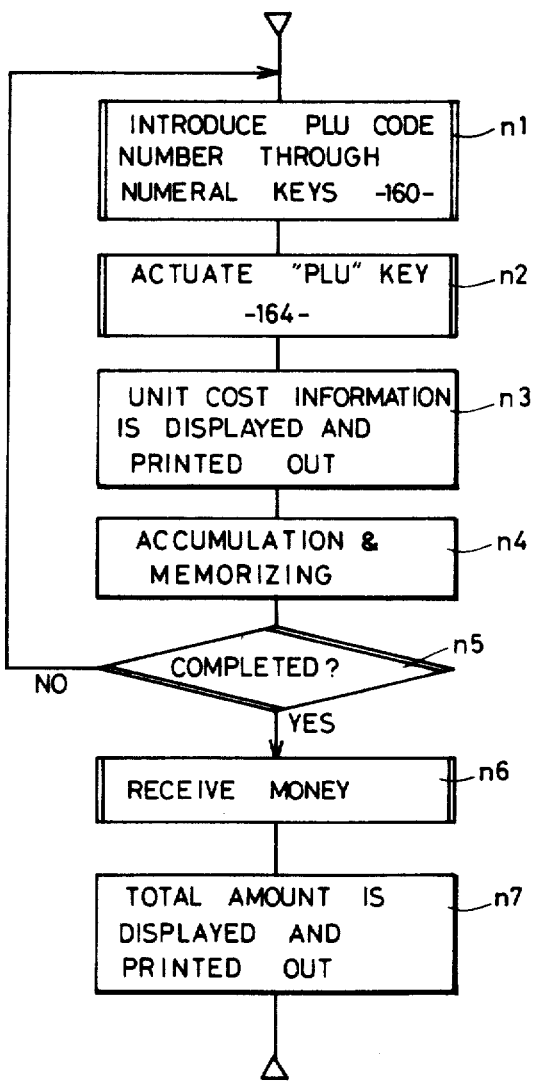
FIG. 2 is a flow chart for explaining the conventional registration operation in an electronic cash register of the prior art having the PLU function.
Figure 6:
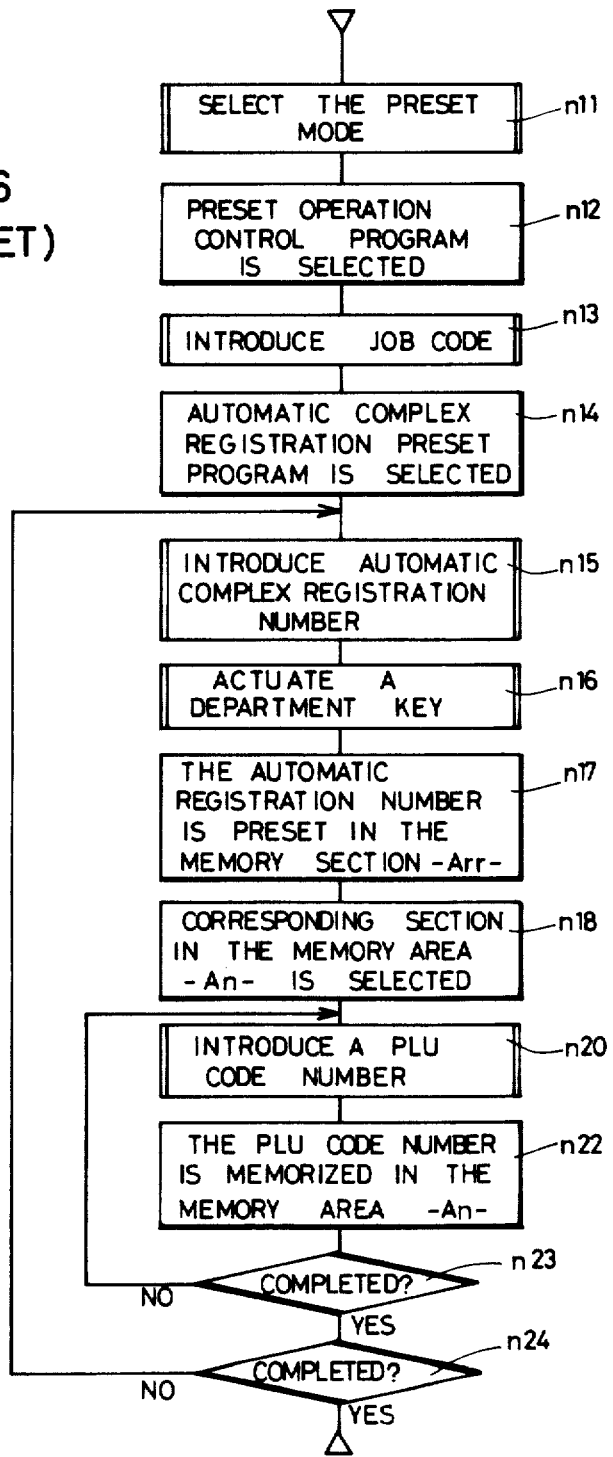
FIG. 6 is a flow chart for explaining a preset operation conducted by the electronic cash register of FIG. 1.

FIG. 2 shows the conventional PLU registration operation of the prior art.

To conduct the registration operation, the mode selection switch 10 is operated to select the registration mode. The selected mode information is stored in a mode information memory area 120 included in the central processing unit (CPU) 12, whereby the central processing unit (CPU) 12 conducts the following operation in accordance with the registration operation control program stored in the read only memory (ROM) 14. The PLU code information related to the purchased commodity is introduced into the electronic cash register through the use of the numeral keys 160 and the PLU key 164 (steps n1 and n2). The central processing unit (CPU) 12 functions to read out, from a predetermined memory area of the random access memory (RAM) 18, the unit cost information corresponding to the introduced PLU code information. The thus read out unit cost information is displayed on the display unit 22, and printed out onto a receipt slip and/or a journal paper by the printer unit 20 (step n3).

Further, the unit cost information is added to the accumulated data stored in an accumulation memory area of the random access memory (RAM) 18 (step n4).

The above-mentioned operation is repeated to complete the registration related to one customer. When the registration operation related to one customer is completed (step n5), the operator receives money from the customer (step n6). The total amount is displayed on the display unit 22 and printed out by the printer unit 20 (step n7).

Figures 3, 4, 5:
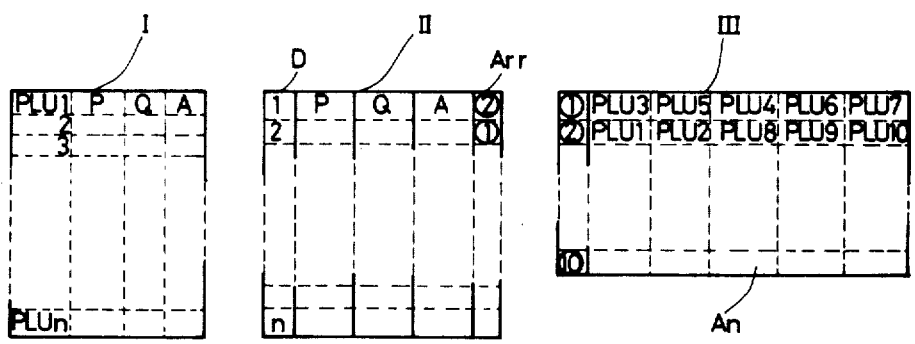
FIGS. 3 through 5 are schematic views for explaining memory areas in a random access memory (RAM) included in the electronic cash register of FIG. 1.

The random access memory (RAM) 18 of the present invention includes memory areas I (shown in FIG. 3), II (shown in FIG. 4) and III (shown in FIG. 5).

The memory area I is provided for conducting the normal PLU operation. That is, the memory area I memorizes the unit cost P, the number Q of the purchased commodities, and the total amount A related to the respective PLU codes PLU1 through PLUn. The memory area II is provided for conducting department registration operation. That is, the memory area II memorizes the unit cost P, the number Q of the purchased commodities, and the total amount A related to the respective departments D (1 through n). Furthermore, the memory area II includes a memory section Arr corresponding to each department. The memory section Arr stores automatic complex registration numbers (①,②, - - -) which indicate whether the complex registration should be performed when the corresponding department key is actuated. The memory area III includes a memory area An which stores a set of PLU codes of which registration should be conducted when the corresponding automatic complex registration number is selected.

An operational mode of the electronic cash register of the present invention will be described.

(i) PRESET OPERATION

The mode selection switch 10 is operated to select the preset mode. The selected preset mode information is stored in the mode information memory area 120 included in the central processing unit (CPU) 12 (step n11). The central processing unit (CPU) 12 selects the preset operation control program stored in the read only memory (ROM) 14 so that the data introduced thereafter is processed in accordance with the preset operation control program (step n12). Then, the operator introduces, through the keyboard panel 16, a specific job code in order to select the program for presetting various data related to the automatic complex registration operation (steps n13 and n14).

The automatic complex registration number is introduced from the numeral keys 160, and a desired department key 166 is actuated (steps n15 and n16) so as to preset whether the department key relates to the automatic complex registration operation. For example, the automatic complex registration number ② is preset in the memory section Arr of the memory area II of the random access memory 18 at the position corresponding to the department key 1, and the automatic complex registration number ① is preset in the memory section Arr at the position corresponding to the department key 2 (step n17).

In response to the actuation of the department key 166 in the above-mentioned operation, the memory position in the memory area An of the memory area III corresponding to the previously introduced automatic complex registration number is selected (step n18). In this example, in response to the actuation of department key 1, the memory position corresponding to the automatic complex registration number ② is selected. Then, the operator introduces desired PLU code numbers through the use of the numeral keys 160 and the PLU key 164 (step n20) so that the desired PLU code numbers are memorized in the corresponding position of the memory area An (step n22). The preset operation is repeated to preset the desired automatic complex registration number to each of the department keys, and to preset a desired set of PLU code numbers to each of the automatic complex registration numbers (steps n23 and n24).

In the embodiment of FIGS. 3, 4 and 5, the automatic complex registration number ② is preset for the department key D(1), and the PLU code numbers PLU1, PLU2, PLU8, PLU9 and PLU10 are preset in connection with the automatic complex registration number ②.

The preset operation related to the unit cost information of each of the PLU code numbers into the memory area I is not described because the unit cost presetting operation is conducted in a same manner so that conducted in the conventional electronic cash register. Furthermore, the unit cost information presetting operation related to the department keys D is conducted in a same manner as conducted in the conventional electronic cash register.

Figure 7:
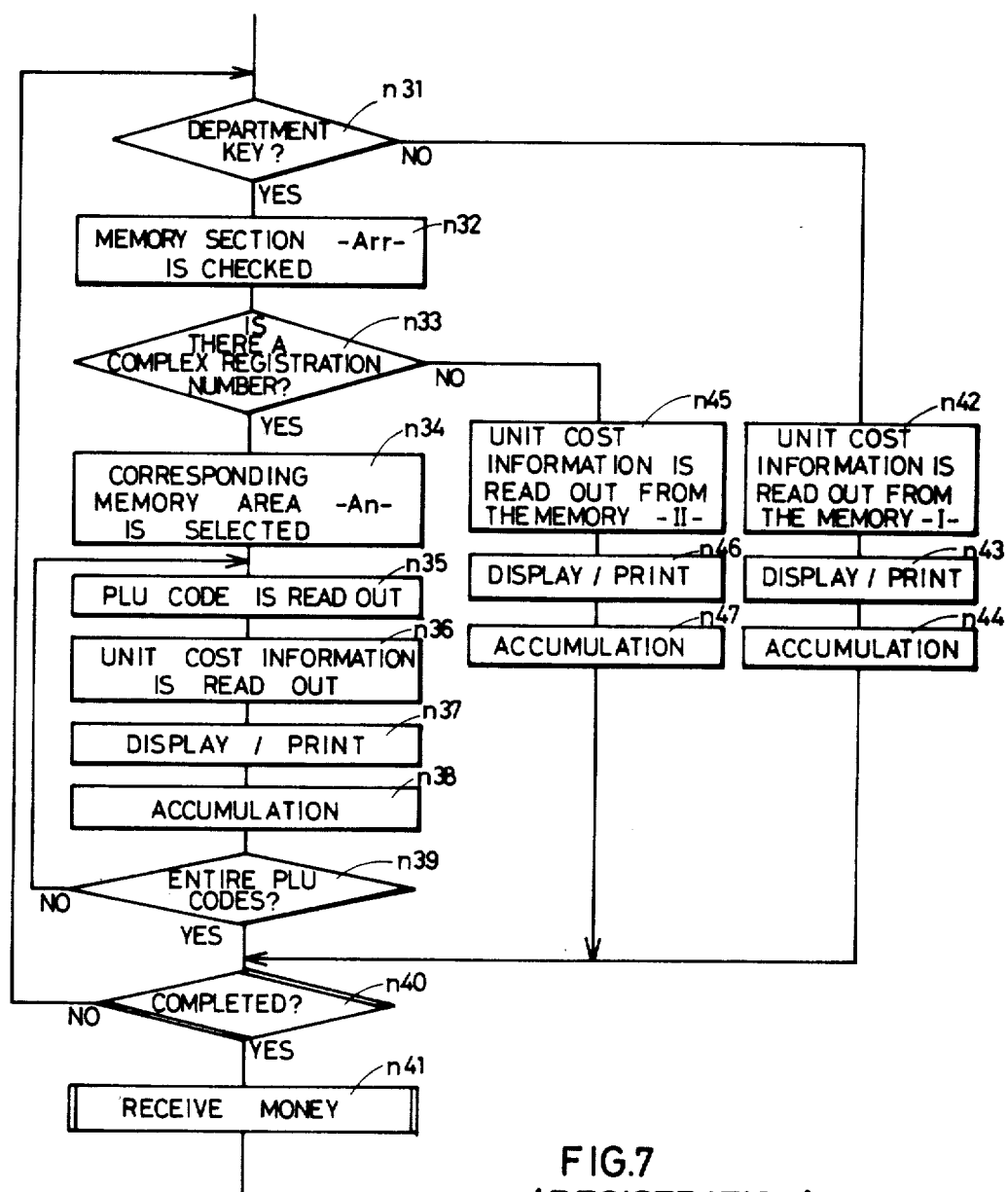
FIG. 7 is a flow chart for explaining an automatic complex registration operation conducted by the electronic cash register of FIG. 1.

FIG. 7 shows an operational mode related to the registration operation.

(ii) AUTOMATIC COMPLEX REGISTRATION OPERATION

The mode selection switch 10 is operated to place the electronic cash register in the registration operation mode. The key input signal introduced through the keyboard panel 16 is applied to the central processing unit (CPU) 12 via the key determination circuit 24. The central processing unit (CPU) 12 functions to determine whether the input signal relates to the department key D or the PLU key 164 (step n31). If the introduced information relates to the department key D, the central processing unit (CPU) 12 checks the memory section Arr whether the automatic complex registration number is preset at the position corresponding to the actuated department key D (steps n32 and n33). If the input signal does not relate to the department key D, the operation is advanced to the step n42 at which the unit cost information related to the selected PLU code number is read out from the memory area I (step n42). The thus read out unit cost information is displayed on the display unit 22 and printed out by the printer unit 20 (step n43), and the transaction data is memorized in the memory area I (step n44).

When an automatic complex registration number is detected in the memory section Arr in the above-mentioned step n33, the central processing unit (CPU) 12 functions to select the memory position in the memory area III corresponding to the detected automatic complex registration number (step n34). The PLU code number memorized in the memory area III is read out (step n35), and the corresponding unit cost information is read out from the memory area I (step n36). The unit cost information read out of memory area I is displayed on the display unit 22 and printed out by the printer unit 20 (step n37). Further, the transaction data is introduced into and accumulated in the corresponding position in the memory area I (step n38). This operation is automatically repeated in connection with the entire PLU code numbers stored in the memory area III (step n39). Thus, the registration related to the plural commodities is automatically conducted when the single department key 166 (D) is actuated.

When the automatic complex registration number is not detected in the memory area Arr at the step n33, the central processing unit (CPU) 12 functions to read out the unit cost information from the memory area II at the position corresponding to the actuated department key 166 (D) (step n45). The read out unit cost information is displayed on the display unit 22 and printed out by the printer unit 20 (step n46). Then, the transaction data is introduced into and memorized or accumulated at the corresponding position in the memory area II (step n47). The registration operation related to one customer is completed (step n40), the total key is actuated, and the operator receives money from the customer (step n41).

As discussed above, in accordance with the present invention, the registration operation related to a set of commodities is automatically conducted when a single department key is actuated. Thus, the multiple registration, and the repeat registration of the set of commodities are easily conducted. Furthermore, the tax rate of the set of commodities can be set in addition to the tax rate for the respective PLU codes.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An automatic complex registration control system in an electronic cash register for registering information related to commodities from a plurality of departments, each of the commodities having an assigned price look up, PLU, code number, comprising:
    a plurality of department keys that instruct a registration operation when a commodity related to one of the plurality of departments is purchased;
    department memory means for storing unit cost information of each commodity that is related to respective ones of said plurality of department keys, said department memory means including a memory area which stores at least one automatic complex registration number with each automatic complex registration number being assigned to at least one of said plurality of department keys said automatic registration number being accessible when said one of said plurality of department keys to which it is assigned is accessed;
    price look up (PLU) memory means for storing unit cost information of each commodity defined by each of the PLU code numbers;
    complex registration memory means for storing at least one list of PLU code numbers, each list of PLU code numbers having a said automatic complex registration number that is stored in said department memory means;
    accessing means for accessing said department memory means in accordance with instructions from said plurality of department keys;
    determination means for determining whether an automatic complex registration number is stored in said memory area at a position accessed by said accessing means, said position corresponding to an actuated one of said plurality of department keys; and
    read out means, responsive to a determination output from said determination means, for reading out,
        said automatic complex registration number stored in said memory area of said department memory means at said position corresponding to said actuated one of said plurality of department keys,
        a list of PLU code numbers stored in said complex registration memory means at a position related to said automatic complex registration number read out from said department memory means, and
        said unit cost information stored in said price look up (PLU) memory means in response to said list of PLU code numbers read out from said complex registration memory.

2. The system of claim 1, further comprising operator actuated preset control means for presetting a desired automatic complex registration number in said memory area included in said department memory means and for presetting a list of desired PLU code numbers in said complex registration memory means.

* * * * *